Dec. 10, 1946.  F. E. MAHUSKY  2,412,225
CLAMP
Filed Aug. 3, 1945  2 Sheets-Sheet 1

INVENTOR.
Frank E. Mahusky
BY
ATTORNEY.

Dec. 10, 1946.   F. E. MAHUSKY   2,412,225
CLAMP
Filed Aug 3, 1945   2 Sheets-Sheet 2

INVENTOR.
Frank E. Mahusky
BY
Ralph L Chappell
ATTORNEY

Patented Dec. 10, 1946

2,412,225

UNITED STATES PATENT OFFICE 2,412,225

CLAMP

Frank E. Mahusky, Brooklyn, N. Y.

Application August 3, 1945, Serial No. 608,802

3 Claims. (Cl. 77—63)

(Granted under the act of March 3, 1883, as amended April 30, 1928; 370 O. G. 757)

This invention relates to a clamp for positioning cylinder heads.

An object of this invention is to provide a clamp for positioning cylinder heads on a drill press during various machine operations.

Another object of this invention is to provide a simple clamp for quickly clamping and unclamping cylinder heads on a drill press with a minimum of effort.

Figure 1:
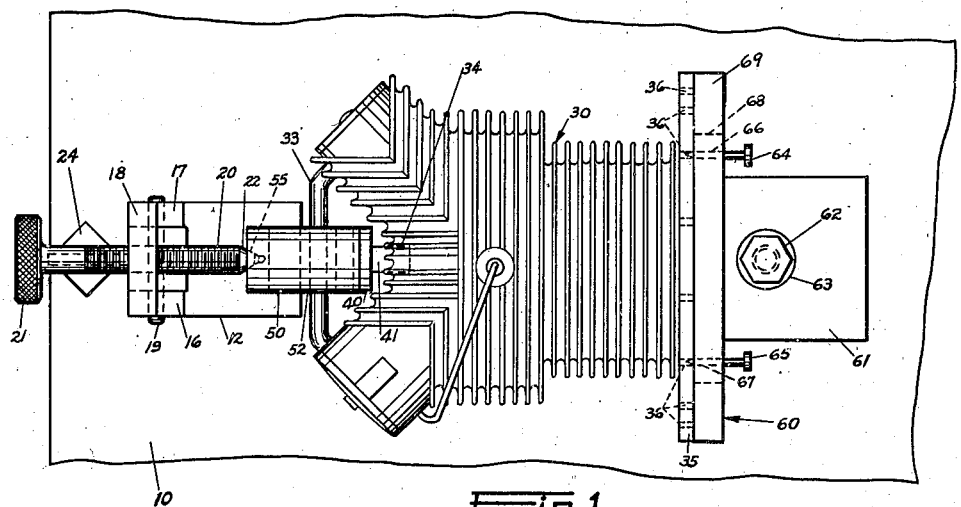
Figure 2:
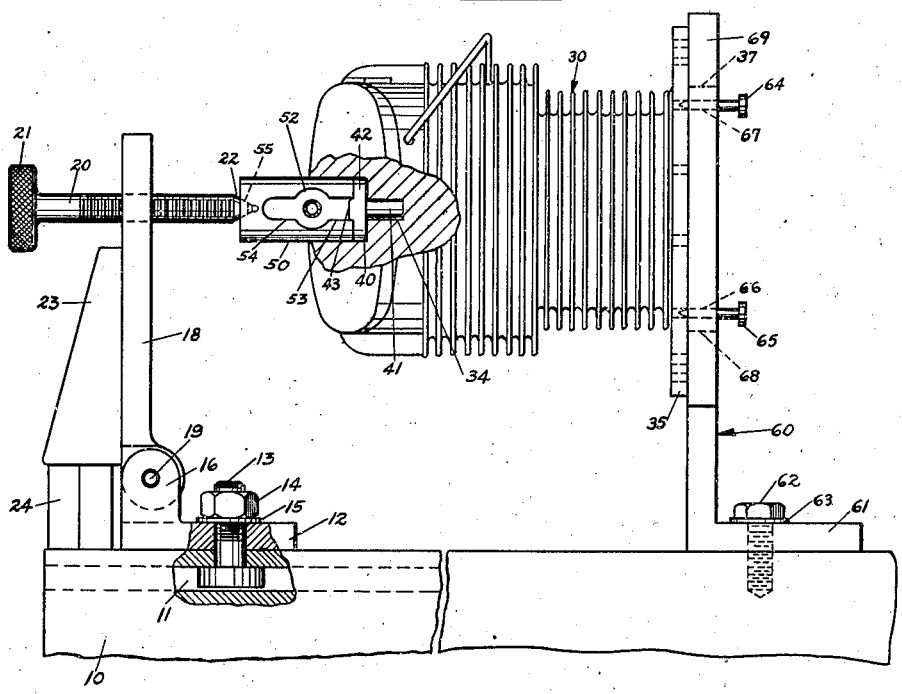
Figure 3:
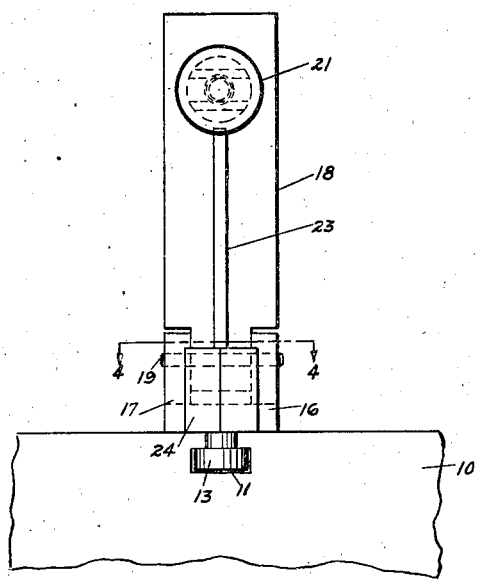
Figure 4:
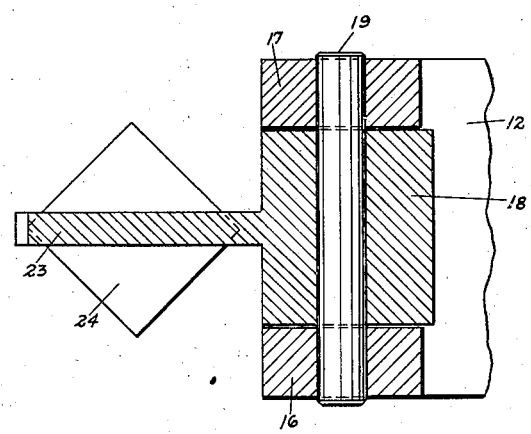

Figure 1 is a top plan view of the clamp with the cylinder head being shown in clamped position, Figure 2 is a front elevation of the clamp with the cylinder head being shown in clamped position, and a portion broken away for clarity of illustration, Figure 3 is an end elevation of the clamp, but omitting the rear support, and Figure 4 is a horizontal section of the hinge taken on the line 4—4 of Figure 3.

Referring to the drawings in detail, a preferred embodiment of the invention is illustrated in Figures 1, 2 and 3 wherein the drill press table on which the clamp is used is indicated by reference numeral 10. Table 10 has a slot 11 of inverted T-shape in which the T bolt 13 is slidably positioned to hold the clamp in place, the T bolt 13 passing through hinge base plate 12 and securing it to the table by means of a washer 15 and a nut 14.

Hinge base plate 12 has upstanding parallel ears 16 and 17 between which is mounted hinge pin 19. Rotatably mounted on hinge pin 19 is clamp gate 18 of a generally rectangular configuration. The back side of clamp gate 18 has a support rib 23 welded thereto along its longitudinal center line and which rests upon a movable block 24 when clamp gate 18 is in its vertical position. A clamp screw 20 is threaded through the clamp gate 18 near its free end and generally normal thereto. Screw 20 has a knurled head 21 for a manual operation and a conical end 22 which fits into a conical recess 55 of intermediate clamp block 50.

Intermediate clamp block 50 is of a cylindrical shape and has a diametric bore 52 therein for a reason to be subsequently disclosed. Axial slots 53 and 54 extend from one end of block 50 through the bore 52 and to a point near the opposite end of block 50.

Slot 53 receives a tongue 43 of clamp plug block 40 which also has a disk 42 of the same diameter as block 50 and an integral projection 41 which is received by a bore 34 of the cylinder head 30 and thereby supporting the cylinder head 30 at that point.

The rear support 60 of the clamp consists of a vertical plate 69 which has a horizontal leg 61 which is bolted to the table 10 by means of screw 62 and washer 63. Plate 69 has apertures 66 and 67 which slidably receive locating pins 64 and 65. An opening 68 is also provided for a purpose to be disclosed.

In the operation of the device the skirt 37 of the cylinder head 30 is inserted into the opening 68 of the plate 69 and the locating pins 64 and 65 are pushed into two of the apertures 36 in the flange 35. The intermediate clamp block 50 is then positioned so that the rocker box oil line 33 is received in the bore 52. The clamp plug 40 is then connected to the block 50 by inserting tongue 43 in the slot 53. The projection 41 is then inserted into the bore 34, the clamp gate 18 swung to its vertical position, the block 24 placed underneath the rib 23 and the clamp screw 20 turned until its conical end 22 is forced into conical recess 55. Additional supporting blocks (not shown) may be utilized as desired beneath the cylinder head 30 to afford additional support. With the cylinder head 30 clamped into position, machine operations can readily be performed and it will be apparent from the above disclosure the clamp can be readily disassembled by merely turning screw 20 and removing block 24. With removal of block 24 clamp gate 18 will fall to a horizontal position, thereby permitting quick removal of the cylinder head 30 as well as quick positioning of another cylinder head. The cylinder head illustrated is of the type used on the "Continental" air cooled engine.

It is to be understood however that the clamp disclosed may be used with many other types of cylinder heads and objects.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A clamp for holding workpieces comprising a base, an elongated member pivoted to said base, a screw in threaded engagement with said elongated member and positioned generally normal to said elongated member, a block, said block having an opening therein, a slot between said opening and the periphery of said block, a clamp plug block, said clamp plug block being removably fitted to said slot, and a projection on said clamp plug block to hold one portion of the workpiece, means to connect said screw to said block, and means to hold another portion of the workpiece.

2. A clamp for holding workpieces comprising a base, upstanding ears on said base, an elongated member pivoted between said ears, a stop on said member adjacent to said pivot, a block for contact with said stop and limiting the upward swing of said member, a screw adjacent the free end of said member and threadedly engaged therewith, said screw having a tapered end, an intermediate block, said intermediate block having a conical recess for engagement with the tapered end of said screw, said intermediate block having an aperture, a slot between said aperture and an end of said intermediate block, a clamp plug block, said clamp plug block having a tongue for engagement with said slot and a projection for supporting the workpiece at a point, and means for supporting the workpiece at another point.

3. A clamp for holding workpieces comprising a base, upstanding parallel ears on said base, a hinge pin between said ears, an elongated member pivoted on said hinge pin, a rib normal to said member, said rib extending longitudinally of said member, a movable block for engagement with said rib when said member is pivoted to a vertical position, a screw in threaded engagement with said member, said screw being normal to said member at a point adjacent the free end thereof, said screw having a conical end, a generally cylindrical block, said cylindrical block having a tapered recess at one end for engagement with said screw, said cylindrical block having a diametric bore, a slot extending axially of said cylindrical block between said bore and the opposed end of said cylindrical block, a clamp plug block, said clamp plug block having a disc of the same diameter as said cylindrical block, a tongue on a diameter of said disc, said tongue engaging said slot, a cylindrical projection on said disc for supporting the workpiece at one point, and means for supporting said workpiece at other points.

FRANK E. MAHUSKY.